Figure 1:
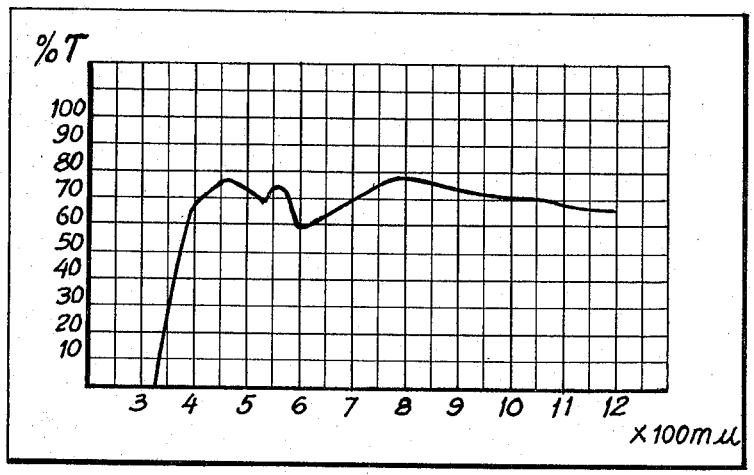

INVENTORS
EMILE PLUMAT
MAURICE JAUPAIN
BY Spencer & Kaye
ATTORNEYS 3,300,323
       GRAY GLASS COMPOSITION
Emile Plumat, Gilly, and Maurice Jaupain, Mont-sur-
  Marchienne, Belgium, assignors to Glaverbel S.A.,
  Brussels, Belgium
         Filed June 11, 1965, Ser. No. 463,131
Claims priority, application Luxembourg, June 29, 1964,
                       46,426
             5 Claims. (Cl. 106—52)

The present invention relates generally to an improvement in gray colored glass, and in particular to gray colored glass made from soda lime glass compositions.

It is an object of this invention to improve upon the quality of gray glass.

It is another object of this invention to provide a gray colored glass at a price less than the prior art gray glass made with praseodymium and neodymium oxides.

Other objects of the invention are to provide a gray colored glass having improved stability over that provided with selenium oxide colored glass.

Applicants incorporate the disclosure of Kirk-Othmer, "Encyclopedia of Chemical Technology" (1951), vol. 7, pp. 175 to 206, into this application as a disclosure of the prior art manufacture of glass of which this application is an improvement. Kirk-Othmer, "Encyclopedia of Chemical Technology," vol. 4, pages 276 to 287 is relied upon by applicants for the prior art disclosure of colors for ceramics and glass, with page 279 giving a particular illustration of nickel as a colorant.

The gray coloration resulting from the nearly uniform absorption of the light rays emitted from within the visible part of the light spectrum, is normally due to the combination of coloring agents, including at least one nickel compound in the prior art manufacture of gray glass.

Nickel, owing to its importance as regards the manufacturing of colored glass, has been carefully studied with a view to getting a clear insight into the mechanism engendering $a_M$ gray coloration.

As disclosed in the "Sprechsaal" review, vol. 66, No. 12, of March 23, 1933, pages 197–199, under the title, "Konstitution und Farben der Chromgläser," Weyl and Thümen, who among other scientists have studied this problem are of the opinion that the nickel compounds mixed with the glass give rise to two coloring centers, each of which contains the divalent nickel ion, whereas these centers differ one from another by the number of oxygen atoms, surrounding the ion. In fact, these two coloring centers are to blame for unpleasant inconveniences consisting in the nickel glass changing its coloration. When a nickel glass is heated, this yellow colored glass turns purple as the absorption intensity of the purple centers decreases. Consequently, it is easily understood why the combination of coloring agents with nickel compounds does not engender a gray coloration, which remains stable.

When we thoroughly study how this coloration agent combined with sulfur behaves, we ascertain another inconvenience. We know that the solubility of the metal sulfides rapidly increases when the temperature rises and that the dissolved sulfide, when it cools, recrystallizes. When the separation occurs above the melting point of the sulfide, we then obtain two non-miscible fusion layers. as regards the nickel sulfide, this sulfide is practically insoluble even at a high temperature and forms solid nodular inclusions which are dangerous, when a nickel glass is heated, because the nodules and the glass surrounding them do not have the same expansion coefficient.

For manufacturing gray colored glass, other coloring agents have been used such as the praseodymium and neodymium oxides which belong to the group of the rare earths. With a view to obtaining an identical result, these two last elements must however be mixed with the vitrifiable mass in quantities appreciably larger than is the case with normal coloring agents. For this reason their use cannot be recommended as they are rather expensive.

When selenium is mixed in the vitrifiable mass to the same purpose, it has been found that more or less large quantities of this metal volatilize in the course of the glass manufacturing process so that discontinuities in the color of the glass appear. On the other hand, the color of the glass changes when the glass is reheated, for instance, with a view to hardening it. These two inconveniences are serious indeed. Besides, it must be added that there is actually a keen demand for this metal owing to the fact that it is used for strategical purposes, this being the reason why it has become rather expensive.

The objects of the present invention are to obviate these inconveniences.

The inventors' concept of the invention is a soda lime glass composition to which coloring agents are added, of which the percentage by weight lies between

|  | Percent |
|---|---|
| $TiO_2$ | 2.0 to 6.0 |
| $MnO_2$ | 0.0 to 2.0 |
| $Fe_2O_3$ | 0.05 to 0.5 |
| $CoO$ | 0.005 to 0.010 |

The method of manufacturing the glass of the present invention is particularly disclosed in Kirk-Othmer, vol. 7, page 178, Figure 1, titled, "Glass Manufacturer," where the temperatures disclosed are for common soda-lime glasses. Typical compositions of commercial glasses are disclosed in Kirk-Othmer, 1951 edition, vol. 7, page 181, Table I, and the components of soda-lime glasses are disclosed on page 182.

By adding coloring agents according to the invention, one obtains a gray colored glass of which the optical properties are not affected by the presence of inclusions. Moreover, when a glass made according to the invention is heated, its color does not change as is the case with a gray colored glass containing nickel. By adding coloring agents, according to the invention, one can obtain a gray colored glass having a price under an acceptable limit.

The glass according to the invention is made by charging a vitrifiable mass composed of the following ingredients in the following percentages by weight.

|  | Percent |
|---|---|
| Sand | 45.92 to 58.75 |
| Sodium carbonate | 15.42 to 17.63 |
| Sodium sulfate | 2.28 to 2.74 |
| Limestone | 2.83 to 6.02 |
| Dolomite | 12.00 to 16.71 |
| Feldspath | 1.23 to 10.49 |
| Coal | 0.11 to 0.13 |
| Titanium oxide | 1.62 to 4.41 |
| Iron oxide | 0.00 to 0.37 |
| Manganese dioxide | 0.00 to 1.62 |
| Cobalt oxide | 0.0040 to 0.0073 |

The manufacturing costs of the vitrifiable mixture made in accordance with the invention are rather low, because the mixture is made with cheap raw materials to which the coloring agents are added. Moreover, this vitrifiable mixture containing the coloring agents can be molten under the conditions under which the soda lime glass can usually be molten and, after refining, the glass obtained may be drawn into glass sheets by means of the machines normally used for this purpose.

The gray colored sheet of drawn glass, made in accordance with the invention is composed of the following analytical final compounds in the following percentages by weight:

| | Percent |
|---|---|
| $SiO_2$ | 67.0 to 72 |
| $Na_2O$ | 13.0 to 15.0 |
| $K_2O$ | 0.10 to 0.15 |
| CaO | 7.50 to 9.00 |
| MgO | 3.20 to 5.00 |
| $Al_2O_3$ | 0.5 to 3.00 |
| $TiO_2$ | 2.0 to 6.00 |
| $MnO_2$ | 0.0 to 2.00 |
| $Fe_2O_3$ | 0.05 to 0.5 |
| CoO | 0.005 to 0.010 |

The drawings of the present invention illustrate the improved properties of the present invention wherein:

FIGURE 1 is a diagram showing how the light transmission percentage varies when the light travels through a first glass, made in accordance with the invention, wherein the vertical axis is the axis of the ordinates on which is represented the rate of transmission of the incident light, expressed in percent and the horizontal axis is the axis of the abscissa on which is represented the wavelength, expressed in millimicrons ($m\mu$) multiplied by 100.

Figure 2:
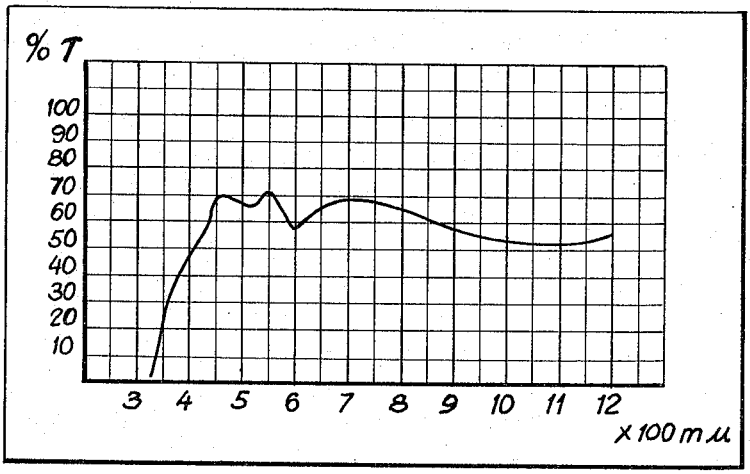

FIGURE 2 is a diagram showing how the light transmission percentage varies when the light travels through a second glass made in accordance with the invention wherein the vertical axis and the horizontal axis are the same as in FIGURE 1.

Without further elaboration, it is belived that one skilled in the art can, using the preceding description, utilize the present invention to its fullest extent. The following preferred specific embodiments are, therefore, to be construed as merely illustrative, and not limitative of the remainder of the specification and claims in any way whatsoever.

*Example I*

With a view to making the first glass in accordance with the invention, the vitrifiable mass is prepared as follows:

| Ingredients: | Percentages by weight |
|---|---|
| Sand | 53.88 |
| Limestone | 6.02 |
| Dolomite | 12.18 |
| Sodium carbonate | 17.53 |
| Sodium sulfate | 2.55 |
| Coal | 0.12 |
| Feldspath | 4.28 |
| Titanium oxide | 3.29 |
| Iron oxide | 0.13 |
| Cobalt oxide | 0.0054 |

The following glass has therewith been obtained by a process as shown in Kirk-Othmer, vol. 7, page 178, Figure 1:

| Ingredients: | Percentages by weight |
|---|---|
| $SiO_2$ | 69 |
| $Na_2O+K_2O$ | 13.50 |
| CaO | 8.60 |
| MgO | 3.30 |
| $Al_2O_3$ | 1.20 |
| $TiO_2$ | 4.00 |
| $Fe_2O_3$ | 0.20 |
| CoO | 0.006 |

The typical properties of the glass obtained are the following:

| | |
|---|---|
| Resistivity at the temperature of 600° C. | 2.204Ω x cm. |
| Thermal expansion | 11.05×10⁻⁶/° C. (25° to 650° C.). |
| Devitrification temperature | 1.031° C. |
| Softening point ($10^{7.65}$ poises) | 650° C. |
| Specific weight | 2.538. | and as regards the same glass drawn up to a thickness lying between 4.5 and 5.1 mm.:

| | |
|---|---|
| Index of refraction | 1.537 |
| Trichromatic coordinates of the glass: | |
| X | 0.308 |
| Y | 0.236 |
| Z | 0.396 |
| Prevailing wavelength _____$m\mu$__ | 553.0 |
| Excitation purity _____percent__ | 5.7 |
| Luminance _____do____ | 62.7 |

FIGURE 1 shows that 30% to 40% of the visible rays of the light are prevented from penetrating into the glass made in accordance with the invention. It is to be noted that the absorption of the light rays coming from within the visible spectrum is nearly uniform and that the $a_M$ inconveniences of which the influence is felt in the present state of the technique, have practically no effect upon said absorption, which remains uniform in the band of the next infra-red rays.

For purposes of comparison, the physical properties of some commercial glasses may be referred to in Kirk-Othmer, vol. 7, p. 188, Table II.

*Example II*

The following vitrifiable mixture was prepared for making the second glass, in accordance with the invention:

| Ingredients: | Percentages by weight |
|---|---|
| Sand | 54.70 |
| Limestone | 5.93 |
| Dolomite | 12.0 |
| Sodium carbonate | 17.27 |
| Sodium sulfate | 2.51 |
| Coal | 0.12 |
| Feldspath | 4.22 |
| Titanium oxide | 1.62 |
| Iron oxide | 0.00 |
| Cobalt oxide | 0.004 |
| Manganese oxide | 1.62 |

The chemical composition of the glass resulting is:

| Ingredients: | Percentages by weight |
|---|---|
| $SiO_2$ | 71 |
| $Na_2O$ | 13.50 |
| CaO | 8.6 |
| MgO | 3.3 |
| $Al_2O_3$ | 1.2 |
| $TiO_2$ | 2 |
| $Fe_2O_3$ | 0.05 |
| CoO | 0.005 |
| $MnO_2$ | 2.0 |

The typical properties of the glass obtained are as follows:

| | |
|---|---|
| Resistivity at a temperature of 600° C. | 2.055Ω x cm. |
| Thermal expansion | 10.87×10⁻⁶/° C. (25 to 650° C.). |
| Devitrification temperature | 1.030° C. |
| Softening point ($10^{7.65}$ poises) | 650° C. |
| Specific weight | 2.534 | and as regards the same glass drawn up to a thickness lying between 4.5 and 5.1 mm.:

| | |
|---|---|
| Index of refraction | 1.530 |
| Trichromatic coordinates of the glass: | |
| X | 0.308 |
| Y | 0.296 |
| Z | 0.396 |
| Prevailing wavelength _____$m\mu$__ | 556.3 |
| Excitation purity _____percent__ | 7.7 |
| Luminance _____do____ | 59.3 |

FIGURE 2 shows that 35 to 45% of the visible light rays are prevented from penetrating into the glass, made in accordance with the invention. In this example, the absorption of the light rays coming from within the visible spectrum is more uniform than is the case with the first example. The absorption is also greater within the band of the next infrared rays and the greater absorption percentage remains uniform also as regards the second example.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In the manufacture of gray colored glass from a soda-lime glass composition the improvement comprising the addition to said soda-lime glass composition of 2 to 6% titanium dioxide, less than 2% manganese dioxide, 0.05 to 0.5% ferric oxide and 0.005 to 0.010% cobalt oxide.

2. In the manufacture of gray colored glass the improvement comprising a vitrifiable mixture comprising by weight 45.92 to 58.75% sand, 15.42 to 17.63% sodium carbonate, 2.28 to 2.74% sodium sulfate, 2.83 to 6.02% limestone, 12.00 to 16.71% dolomite, 1.23 to 10.49% feldspath, 0.11 to 0.13% coal, 1.6 to 4.41% titanium oxide, less than 0.37% iron oxide, less than 1.62% manganese dioxide and 0.0040 to 0.0073% cobalt oxide.

3. A gray colored glass having the analytical final compounds in percentage by weight comprising 67.0 to 72% $SiO_2$, 13.0 to 15.0% $Na_2O$, 0.10 to 0.15% $K_2O$, 7.50 to 9.00% CaO, 3.20 to 5.00% MgO, 0.5 to 3.00% $Al_2O_3$, 2.00 to 6.00% $TiO_2$, less than 2.00% $MnO_2$, 0.05 to 0.5% $Fe_2O_3$, and 0.005 to 0.010% CoO.

4. A gray colored glass having a composition in percentage by weight comprising 69% $SiO_2$, 13.5% $Na_2O$ and $K_2O$, 8.6% CaO, 3.3% MgO, 1.2% $Al_2O_3$, 4% $TiO_2$, 0.2% $Fe_2O_3$ and 0.006% CoO.

5. A gray colored glass having a composition in percentage by weight comprising 71% $SiO_2$, 13.5% $Na_2O$, 8.6% CaO, 3.3% MgO, 1.2% $Al_2O_3$, 2% $TiO_2$, 0.05% $Fe_2O_3$, 0.005% CoO and 2% $MnO_2$.

References Cited by the Examiner

UNITED STATES PATENTS

| | | | |
|---|---|---|---|
| 1,292,299 | 2/1919 | Gage | 106—53 |
| 2,636,420 | 4/1953 | Ryan et al. | 106—52 |
| 2,755,212 | 7/1956 | Brown | 106—52 |
| 2,901,366 | 8/1959 | Smith et al. | 106—52 |

TOBIAS E. LEVOW, *Primary Examiner.*

H. McCARTHY, *Assistant Examiner.*